United States Patent [19]

Whitear

[11] 4,277,398

[45] Jul. 7, 1981

[54] MAGENTA-MASKED COLOR AZOPYRAZOLINONE COUPLERS

[75] Inventor: Brian R. D. Whitear, Hutton, England

[73] Assignee: Ciba-Geigy AG, Basel, Switzerland

[21] Appl. No.: 64,660

[22] Filed: Aug. 8, 1979

Related U.S. Application Data

[63] Continuation of Ser. No. 843,628, Oct. 19, 1977, abandoned.

[30] Foreign Application Priority Data

Nov. 15, 1976 [GB] United Kingdom ............... 47423/76

[51] Int. Cl.$^3$ ........................ C09B 29/00; C09B 29/46

[52] U.S. Cl. .................................... 260/162; 260/163; 260/158; 430/555

[58] Field of Search ........................ 260/162, 163, 158

[56] References Cited

U.S. PATENT DOCUMENTS

| | | | |
|---|---|---|---|
| 2,959,582 | 11/1960 | Schimmelschmidt et al. | 260/163 |
| 2,983,608 | 5/1961 | Beavers | 430/555 |
| 3,148,062 | 9/1964 | Whitmore et al. | 260/163 |
| 3,751,406 | 8/1973 | Bloom | 260/162 |
| 3,925,347 | 12/1975 | Huyffer | 260/147 |
| 3,928,312 | 12/1975 | Fleckenstein | 260/156 |
| 3,931,144 | 1/1976 | Eldredge et al. | 260/197 |
| 3,932,380 | 1/1976 | Krutak et al. | 260/197 |
| 4,013,633 | 3/1977 | Haase et al. | 260/162 |
| 4,165,987 | 8/1979 | Green et al. | 260/163 X |
| 4,200,570 | 4/1980 | Steiner | 260/163 |

FOREIGN PATENT DOCUMENTS

| | | | |
|---|---|---|---|
| 1464361 | 2/1977 | United Kingdom | 260/163 |

*Primary Examiner*—John Doll

*Attorney, Agent, or Firm*—Sprung, Felfe, Horn, Lynch & Kramer

[57] ABSTRACT

Orange colored magenta color couplers of the general formula

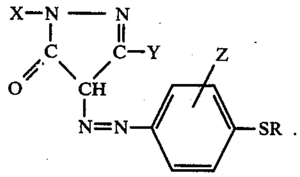

are provided, in which R is optionally substituted alkyl, aralkyl, aryl or a heterocyclic group, X is optionally substituted aryl, Y is optionally substituted acyl-amino, aroyl amino or aryl amino and Z represents further optional substituents of the phenyl ring. Preferably Y also contains a ballasting group, which is a long claim alkyl group having 10 to 24 carbon atoms in the chain.

6 Claims, No Drawings

MAGENTA-MASKED COLOR AZOPYRAZOLINONE COUPLERS

This is a continuation of application Ser. No. 843,628 filed Oct. 19, 1977 now abandoned.

This invention relates to colour photography and in particular to coloured colour couplers for use in the preparation of colour corrected photographic negatives.

Colour couplers which react during the colour development process with the oxidation products of primary aromatic amines usually para phenylene diamine derivatives to form coloured dyes in a layer of photographic material are well known. The use of coloured colour couplers which are colour couplers containing a chromophore group which is split off or destroyed during the coupling reaction with the oxidation products of the colour developing agent so that the original colour is destroyed and a new dye formed at those places where development of the silver in the emulsion layer has occurred is also well known. U.S. Pat. No. 2,983,608 concerns e.g. yellow coloured magenta-forming couplers. There is formed in the silver halide layer a dye image but there is left in this layer some of the residual uncoupled coloured colour coupler. To achieve correct colour correction it is required that the sum of the absorption of the residual coloured colour coupler and that of the coupled colour coupler should remain the same in those regions of the spectrum where colour correction is required, irrespective of the value of the primary image density. An overall colour cast in the colour negative image is thus obtained, but this colour cast is nullified during printing of the negative by use of a slightly longer exposure time. The use of coloured colour couplers in colour negative material is desirable because most of the dyes obtained when either cyan or magenta colour couplers are used exhibit considerable unwanted absorption in parts of the visible spectrum outside the cyan or magenta bands. For example most magenta colour couplers produce magenta dyes which exhibit an area of unwanted blue absorption in the region of 400 to 450 nm.

We have now discovered a class of orange-coloured magenta couplers which are active and which absorb light in the blue region and thus in the unreacted state act as effective masks counter-acting the unwanted absorption of magenta dyes and which when coupled with the oxidation products of a para-phenylene diamine developer give a magenta dye in high yield.

According to the present invention there is provided an orange-coloured magenta colour coupler of the pyrazolinone class of the general formula

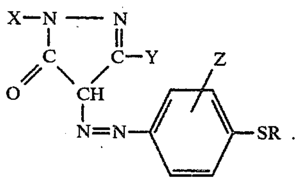

wherein R is optionally substituted alkyl, aralkyl, aryl or an optionally substituted heterocyclic group, X is optionally substituted aryl, Y is optionally substituted acylamino, aroylamino or arylamino and Z represents further optional substitution of the phenyl ring.

Preferably R is alkyl of 1 to 4 carbon atoms; benzyl or phenylethyl, which may be optionally substituted by alkyl or alkoxy of 1 to 4 carbon atoms each or by halogen such as chlorine or bromine; phenyl or phenyl substituted by alkyl of 1 to 4 carbon atoms or by halogen such as chlorine or bromine. If R denotes a heterocyclic group mono or bicyclic heterocyclic groups are suitable.

As substituents R methyl, phenyl, 4-tolyl, 4-chlorophenyl and 2-benzthiazolyl are of special interest. Particularly suitable are methyl and 4-tolyl. Preferably X is phenyl or halogen or cyano- substituted phenyl. Most preferably X is 2,4,6-trichlorophenyl. Examples of the other substituents which may be present on X are alkoxy, alkylthio, alkyl, acyl, acylamino (all containing preferably up to 5 carbon atoms) and sulphonylamino.

The optionally substituted acylamino, aroylamino or arylamino of the substituent Y can also contain a ballasting group. Examples of ballasting groups are long chain alkyl or alkenyl groups of 10 to 24 carbon atoms and phenyl, to which is attached alkyl, preferably at least two alkyl groups each having at least 6 carbon atoms. By ballasting group is meant a group which renders the colour coupler substantive to the layer in which it has been coated.

Preferably Y is substituted arylamino or aroylamino such as substituted anilino and benzamido. Particularly suitable anilino is 2-chloro-5—CH—$COR_1$-anilino, wherein $R_1$ is alkyl of at least 10 carbon atoms, for example 10 to 24 or preferably 10 to 18 carbon atoms. A specific example of such a group is the 2-chloro-5-[-2-(4 tert.amylphenoxy)-(2-n-dodecyl acetamido)]-anilino group. Another suitable anilino is the 2-chloro-5-(3-octadecenylamido)-anilino group. A specific example of benzamido as substituent Y is 5-(2,4-ditert.amylphenoxyacetamido)-benzamido.

Compounds of formula (1) are of orange-yellow colour exhibiting an absorbtion in the range of 410 to 450 nm. Thus they are able to correct for the unwanted blue light absorption of the magenta dye formed on colour coupling and of another magenta dye formed on colour coupling formed from another magenta coupler which may be present in the same layer.

The compounds of formula (1) can be prepared in a high degree of purity and when the ballasting group in Y contains 28 or more carbon atoms including a long chain alkyl group having for example 12 carbon atoms they can still be prepared as crystalline compounds. The compounds of formula (1) have a good oil solubility which enables them to be incorporated in photographic layers as an oil emulsion.

The coloured couplers of formula (1) may be prepared by reacting a pyrazolinone colour coupler of the formula

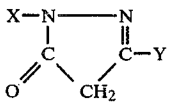

(2)

wherein X and Y have the meanings assigned to them above, with a diazo salt of the formula

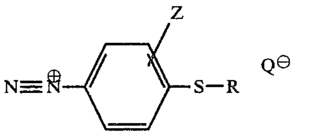

(3)

wherein R and Z have the meaning assigned to them above and Q is an anion, in an alkaline medium.

Preferably the alkaline medium is substantially anhydrous, the reactants being dissolved in an organic liquid for example methoxyethanol.

Pyrazolinone colour couplers of formula (2) are known compounds as described for example in U.S. Pat. Nos. 2,600,788, 2,908,573, B.P. 680,488, 1,129,333, 1,129,640.

According to another aspect of the present invention there is provided colour photographic material which comprises at least one silver halide emulsion layer which also contains at least one colour coupler of formula (1).

According to yet another aspect of the present invention there is provided a process for the production of a masked magenta image in a photographic layer which comprises imagewise exposing photographic material which comprises at least one silver halide emulsion layer which contains at least one colour coupler of formula (1) and developing the exposed material in a colour developing solution which comprises a colour developing agent of the substituted paraphenylene diamine type.

Preferably the colour photographic material of the present invention contains a mixture of a coloured colour coupler of formula (1) and an uncoloured colour coupler which may be a colour coupler of formula (2).

Preferably the ratio of coloured colour coupler of formula (1) to an uncoloured colour coupler is about 1:20 to 1:4.

The following procedure was followed when testing the coloured colour couplers of the present invention.

Testing Procedure

A dispersion of the azo couplers in gelatin was prepared as follows, $2.65.10^4$ mole of the coupler was dissolved in a mixture of an equal weight of tricresyl phosphate or similar oil and three times the weight of ethyl acetate. To the solution was added a 10% gelatin solution (14 g) containing a 1% aqueous solution of sodium dioctyl sulpho succinate (4 ml) and the whole dispersed using an ultrasonic mixer.

The dispersion was added to a blended silver-iodo-bromide emulsion (10 g) having a silver content of 190 mg and an iodide content of 2.48 molar percent. A 0.1% solution of a triazine hardening agent was added until the total weight was 56 g. The mixture was coated onto subbed triacetate film base and dried. The silver coating weight was 14 mg per $dm^2$. The coating thus obtained was exposed to light behind a step wedge and then processed through the following baths at 37.8° C. in the order given.

| | |
|---|---|
| 1. Colour Development | 3.25 minutes |
| 2. Bleach | 6.5 minutes |
| 3. Wash | 3.25 minutes |
| 4. Fix | 6.5 minutes |
| 5. Wash | 3.25 minutes |

-continued

| | |
|---|---|
| 6. Stabilizer | 1.5 minutes |

The processing baths comprise the following.

| | | |
|---|---|---|
| 1. Developer: | potassium carbonate | 33.0 g |
| | sodium metabisulphite (Anhydrous) | 3.2 g |
| | potassium bromide | 1.4 g |
| | hydroxylamine sulphate | 1.8 g |
| | 4-N-ethyl-N-(2-hydroxy-ethyl)-amino-2-methyl anilinium sulphate | 4.9 g |
| | water to: | 1000 ml |
| 2. Bleach: | ammonium bromide | 150 g |
| | ethylene diamine tetra-acetic acid ferric sodium chelate | 100 g |
| | glacial acetic acid | 10 ml |
| | water to: | 1000 ml |
| 3. Fix: | ammonium thiosulphate | 100 g |
| | sodium sulphite | 14 g |
| | water to: | 1000 ml |
| 4. Stabilizer: | 37% formaldehyde solution | 5 ml |
| | water to: | 1000 ml |

After processing both the optical densities and the light absorption characteristics were measured. The test procedure was repeated using the parent unmasked coupler of the masked derivative and again the optical densities and light absorption characteristics were measured. Thus by calculation the light absorption of the unreacted mask was obtained together with a measure of reaction at given exposure level.

The following Examples will serve to illustrate the invention.

EXAMPLE 1

1-(2,4,6-trichlorophenyl)-3-[5-{2-(4-tert.amylphenoxy)-(2-dodecylacetamido}-2-chloroanilinyl]-4-(4-phenylthio-phenylazo)-5-pyrazolinone.

Preparation of 4-phenylthio-nitrobenzene.

Thiophenol (11 g) was dissolved in a solution of 50 ml of 2-methoxyethanol containing 6.6 g of potassium hydroxide (pellets) and the solution was added dropwise to one of 16 g of 4-chloronitrobenzene in 30 ml of 2-methoxyethanol and the mixture was heated under reflux for 30 minutes. 200 ml of water was added and the precipitated product extracted with $CCl_4$ which was dried and evaporated. The residue was recrystallized from isopropanol. Yield: 20 g Mp: 54° C.

Preparation of 4-phenylthioaniline.

5 g of the nitro compound was dissolved in 80 ml of 2-methoxyethanol and 17.5 ml of concentrated hydrochloric acid and 16.8 g of stannous chloride ($SnCl_2.2H_2O$) was added. The mixture was heated on the steam bath for 1½ hours then poured into water containing an excess of potassium hydroxide. The amide was collected, washed and dried then recrystallized from methanol. Yield: 4.2 g Mp: 99° C.

Preparation of Azo-mask using preformed colour coupler.

Solution A.

0.5 g of 4-phenylthioaniline was dissolved in a mixture of 5.0 ml of 2-methoxy ethanol, 1.5 ml of concentrated hydrochloric acid and 1.5 ml of acetic acid, then diazotized at 5° C. with a solution of 0.25 g of sodium nitrite in 0.3 ml of water.

Solution B.

1.46 g of the preformed colour coupler 1-(2,4,6-trichlorophenyl)-3-[5-{2-(4-tert.amylphenoxy)-(2-dodecylacetamido)}-2-chloroanilinyl]-5-pyrazolinone and 2.5 g of potassium acetate were dissolved in 50 ml of 2-methoxymethanol and treated with solution (A) at 10° C. It was stirred for 30 minutes then poured into 300 ml of water and the product collected. The azo-masked colour coupler was recrystallized from amylacetate and methanol. Yield: 1.7 g. Mp 99° C.

When tested and processed as described in the Testing Procedure the colour coupler had a λmax of 428 nm and exhibited a high reactivity.

EXAMPLE 2

1-(2,4,6-trichlorophenyl)-3-[5-{2-(4-tert.amylphenoxy)-(2-dodecyl acetamido)}-2-chloroanilinyl]-4-[4-(4-tolylthio)-phenylazo]-5-pyrazolinone.

The 4-(4-tolylthio)nitrobenzene (Mp: 82° C.) and the 4-(4-tolylthio)-aniline (Mp: 76° C.) were prepared as described for the phenylthio analogues of Example 1.

Azo Mask.

The preparation of the azo mask was carried out exactly as described in Example 1, except 0.5 g of the 4-phenylthioaniline was replaced by 0.54 g of 4-(4-tolylthio)aniline. The mask was recrystallized from amylacetate and methanol. Yield: 0.84 g. Mp 104°-6° C.

When incorporated into a photographically active emulsion and processed as described in the testing procedure the resultant film had a λmax of 433 nm and showed a high reactivity.

EXAMPLE 3

1-(2,4,6-trichlorophenyl)-3-[5-(2,4-ditert.amylphenoxyacetamido)-benzamido]-4-[4-(4-tolylthio)phenylazo]-5-pyrazolinone.

Solution A.

0.54 g of 4-(4-tolylthio)aniline was dissolved in 5 ml of 2-methoxy ethanol and 1.5 ml of acetic acid; then 1.5 ml of concentrated hydrochloric acid was added. The solution was diazotized with 0.25 g of sodium nitrate in 0.3 ml of water below 8° C.

Solution B.

1.26 g of 1-(2,4,6-trichlorophenyl)-3-[5-(2,4-ditert.amylphenoxyacetamido)-benzamido]-5-pyrazolinone and 2.5 g of potassium acetate were dissolved in 50 ml of 2-methoxyethnaol and treated dropwise at 10° C. with solution A. The mixture was stirred for 1 hour, then poured into 350 ml of water; the solid was collected and dried. It was recrystallised: Yield: 0.95 g. Mp: 133° C.

When tested as described in the testing procedure the resultant azo dye had a λmax of 438 nm.

EXAMPLE 4

1-(2,4,6-trichlorophenyl)-3-[2-chloro-5-(3-octadecylsuccinimido)-anilinyl]-4-[4-(4-tolylthio)phenylazo]-5-pyrazolinone.

This was prepared as for example 3 except the coupler of solution B was replaced by 1.38 g of 1-(2,4,6-trichlorophenyl)-3-[2-chloro-5-(3-octadecylsuccinimido)-)anilinyl]-5-pyrazolinone. The mask had a melting point of 146° C. When recrystallized, and when tested in a photographically active emulsion as described in the testing procedure the resultant dye had a λmax of 430 nm.

EXAMPLE 5

1-(2,4,6-trichlorophenyl)-3-[2-chloro-5-{2-(4-hydroxy-3-tert.butylphenoxy)}-(2-dodecylacetamido)anilinyl]-4-[4-(4-tolylthio)phenylazo]-5-pyrazolinone.

This was prepared as described for example 3 except the coupler of solution B was replaced by 1.46 g of 1-(2,4,6-trichlorophenyl)-3-[2-chloro-5{2-(4-hydroxy-3-tert-butylphenoxy}-2-(dodecylacetamido)-anilinyl]-5-pyrazolinone. The azo dye had a melting point of 80° C. and a λmax of 430 nm.

EXAMPLE 6

1-(2,4,6-trichlorophenyl)-3-[2-chloro-5-{2-(2,4-ditert.amylphenoxy)-(2-ethylacetamido)}anilinyl]-4-[4-(4-tolylthio)phenylazo]-5-pyrazolinone.

This mask was prepared by the method of example 3, except that the coupler of solution B was replaced by 1.33 g of 1-(2,4,6-trichlorophenyl)-3-[2-chloro-5-{2-(2,4-ditert.amylphenoxy)-(2-ethylacetamido)}anilinyl]-5-pyrazolinone. It was recrystallized from amylacetate and methanol and had a melting point of 158° C. When tested by the method of the testing procedure the dye obtained had a λmax of 430 nm.

EXAMPLE 7

1-(2,4,6-trichlorophenyl)-3-[2-chloro-5-{2-(4-tert.amylphenoxy)-(2-dodecylacetamido)}anilinyl]-4-[4-(4-tolylthio)-2,5-dimethoxy phenylazo]-5-pyrazolinone.

1.46 g of 1-(2,4,6-trichlorophenyl)-3-[2-chloro-5-{2-(4-tert.amylphenoxy)-(2-dodecylacetamido)}anilinyl]-5-pyrazolinone and 3.0 g of potassium acetate were dissolved in 30 ml of 2-methoxy ethanol, then treated dropwise with a solution of 0.98 g of 2,5-dimethoxy-4-(4 tolylthio)-benzene diazonium zinc chloride in 30 ml of 2-methoxy ethanol. The mixture was poured into 500 ml of water and the precipited solids collected. The dye was recrystallized from ethylacetate and had a melting point of 188° C. Yield: 1.25 g.

EXAMPLE 8

1-(2,4,6-trichlorophenyl)-3-[2-chloro-5-{2-(4-tert.amylphenoxy)-(2-dodecylacetamido)}anilinyl]-4-[4-(4-chlorophenylthio)phenylazo]-5-pyrazolinone.

The 4-(4-chlorophenylthio)nitrobenzene (Mp: 88° C.) and the 4-(4-chlorophenylthio)aniline (Mp: 65° C.) were prepared by the method described for the phenylthio analogous in Example 1.

Azo Mask.

The preparation of the azo mask was carried out by the procedure described in Example 1, except that the 4-phenylthioaniline of solution A was replaced by 0.59 g of 4-(4-chlorophenylthio)aniline. The isolated dye was recrystallized from ethylacetate and methanol. Mp: 124° C. It had a λmax of 422 nm in chloroform.

EXAMPLE 9

1-(2,4,6-trichlorophenyl)-3-[2-chloro-5-{2-(4-tert.amylphenoxy)-(2-dodecylacetamido)}anilinyl]-4-[2-benzthiazolylthio)phenylazo]-5-pyrazolinone.

The 4-(2-benzthiazolylthio)nitrobenzene (Mp: 117° C.) and the 4-(2-benzthiazolylthio)-aniline (Mp: 125° C.) were prepared by the method outlined for the analogous phenylthio compounds in Example 1.

Azo Mask.

The azo mask was prepared as described in Example 1. The compound was obtained as an orange powder with a melting point of 85° C. and had a λmax of 407 nm in chloroform.

EXAMPLE 10

1-(2,4,6-trichlorophenyl)-3-[2-chloro-5-{2-(4-tert.amylphenoxy)-(2-ethylacetamido)-}anilinyl]-4-[4-(5,6-dimethoxy-2-benzthiazolylthio)phenylazo]-5-pyrazolinone.

The intermediates and azo mask were prepared by the method described in Example 1. The mask was recrystallized from acetone yielding orange yellow needles with a melting point of 232° C. It had a λmax of 411 nm in chloroform.

EXAMPLE 11

1-phenyl-3-[5-(2,4-ditert.amylphenoxyacetamido)-benzamido]-4-[4-(4-tolylthio)phenylazo]-5-pyrazolinone.

This was prepared as described for the analogous trichlorophenyl compound in example 4. It separated from ethylacetate and methanol as orange crystals with a melting point of 160° C. and had a λmax 430 nm in chloroform.

EXAMPLE 12

1-(2,4,6-trichlorophenyl)-3-[2-chloro-5-{2-(4-tert.amylphenoxy)-(2-ethylacetamido)-}anilinyl]-4-(methylthiophenylazo)-5-pyrazolinone.

The 4-methylthioaniline was prepared by stannous chloride reduction of the product of methylation of 4-nitro thiophenol (JACS, 1946 Vol 68. p491).

A liquid compound was obtained. Boiling point: 140° C./15 mm.

Azo Mask.

The mask was prepared by the method described in Example 1. It was obtained as micro needles when recrystallized from ethylacetate and methanol. It had a melting point of 226° C. and a λmax of 429 nm.

EXAMPLE 13

1-(2,4,6-trichlorophenyl)-3-[2-chloro-5-{2-(4-tert.amylphenoxy)-(2-dodecylacetamido)-}anilinyl]-4-(methylthiophenylazo)-5-pyrazolinone.

This azo dye and the intermediate 4-methylthioaniline were prepared by the methods described in examples 1 and 12 respectively. The mask was recrystallized from amylacetate and methylalcohol, had a melting point of 140° C. and when tested in a photographically active silver halide emulsion as described in example 3 it showed high reactivity and had an absorption (λmax) of 430 nm.

EXAMPLE 14

1-(2,4,6-trichlorophenyl)-3-[2-chloro-5-{2-(4-hydroxy-3-tert.butyl phenoxy)}-(2-dodecylacetamido)-anilinyl]-4-(4-methylthiophenylazo)-5-pyrazolinone.

This mask was prepared from 1-(2,4,6-trichlorophenyl)-3-[2-chloro-5-{2-(4-hydroxy-3-tert.butyl phenoxy}-2-dodecylacetamido)anilinyl]-5-pyrazolinone and diazotized 4-methylthio aniline in alkaline solution as described in examples 5 and 12. It had a melting point of 95° C. and a λmax of 429 nm.

I claim:

1. An orange-colored magenta color coupler of the pyrazolinone class of the formula

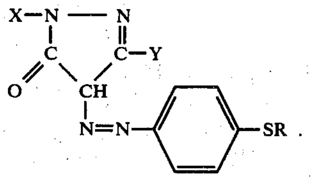

wherein R is alkyl of 1 to 4 carbon atoms, benzyl or phenylethyl optionally substituted by alkyl or alkoxy of 1 to 4 carbon atoms or by halogen, phenyl or phenyl substituted by alkyl of 1 to 4 carbon atoms or halogen, or 2-benzthiazolyl, X is phenyl or phenyl substituted by halogen, cyano, alkyl, alkoxy, alkylthio, acyl, carboxylic acid-acylamino each up to 5 carbon atoms and sulphonylamino and Y is a member selected from the group consisting of 2-chloro-5-[2-(4-tert.amylphenoxy)-(2-n-dodecylacetamido)]-anilino, 2-chloro-5-[2-(4-hydroxy-3-tert.butylphenoxy)]-[2-n-dodecylacetamido)]-anilino, 2-chloro-5-[2-(4-hydroxy-3-tert.butylphenoxy]- (2-dodecylacetamido)-anilino and 2-chloro-5-(3-octadecylsuccinimido)-anilino.

2. A magenta coupler according to claim 1, wherein R is methyl, phenyl, 4-tolyl or 4-chlorophenyl.

3. A magenta coupler according to claim 2, wherein R is methyl or 4-tolyl.

4. A magenta coupler according to claim 1, wherein X is phenyl or halogen or cyano substituted phenyl.

5. A magenta coupler according to claim 4, wherein X is 2,4,6-trichlorophenyl.

6. A magenta coupler according to claim 1, which is 1-(2,4,6-trichlorophenyl)-3-[5-{2-(4-tert.amylphenoxy)-(2-dodecyl acetamido)}-2-chloroanilinyl]-4-[4-(4-tolylthio)phenyl-azo]-5-pyrazolinone.

* * * * *